US009630493B2

(12) United States Patent
Stares et al.

(10) Patent No.: US 9,630,493 B2
(45) Date of Patent: Apr. 25, 2017

(54) VEHICLE AND METHOD OF CONTROLLING A VEHICLE

(75) Inventors: Pete Stares, Whitley (GB); David Clare, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 351 days.

(21) Appl. No.: 14/000,393

(22) PCT Filed: Feb. 20, 2012

(86) PCT No.: PCT/EP2012/052851
§ 371 (c)(1),
(2), (4) Date: Nov. 2, 2013

(87) PCT Pub. No.: WO2012/110659
PCT Pub. Date: Aug. 23, 2012

(65) Prior Publication Data
US 2014/0067218 A1   Mar. 6, 2014

(30) Foreign Application Priority Data
Feb. 18, 2011 (GB) .................................. 1102824.8

(51) Int. Cl.
*B60K 23/08* (2006.01)
*F16H 61/10* (2006.01)

(52) U.S. Cl.
CPC ............ *B60K 23/08* (2013.01); *F16H 61/10* (2013.01); *B60K 2023/0883* (2013.01); *B60Y 2400/82* (2013.01); *F16H 2300/14* (2013.01)

(58) Field of Classification Search
None
See application file for complete search history.

(56) References Cited

U.S. PATENT DOCUMENTS 4,484,653 A    11/1984   Horikoshi et al.
4,681,185 A     7/1987   Hoernig et al.
(Continued)

FOREIGN PATENT DOCUMENTS

CN   101386267 A    3/2009
EP      1500546 A1   1/2005
(Continued)

OTHER PUBLICATIONS

International Search Report for PCT/EP2012/052851 dated Sep. 7, 2012, 3 pages.
(Continued)

*Primary Examiner* — Jonathan M Dager
(74) *Attorney, Agent, or Firm* — Reising Ethington P.C.

(57) ABSTRACT

A motor vehicle having: a prime mover; first and second groups of wheels; and a driveline operable by a controller to connect a torque transmission path from the prime mover to the wheels. The driveline connects the second group to the torque transmission path by an auxiliary portion including first and second releasable torque transmitting devices and a prop shaft. The controller operates the auxiliary portion to switch the driveline between first and second modes such that in the first mode the prop shaft is disconnected from both the torque transmission path and second group of wheels. The driveline transitions from the first mode to the second mode responsive to a value of a vehicle operating parameter, and when a transition to the second mode is made the vehicle is operable not to transition back to the first mode from the second mode before a disconnect delay period has expired.

30 Claims, 4 Drawing Sheets

(56) References Cited

U.S. PATENT DOCUMENTS

| | | | |
|---|---|---|---|
| 5,819,194 A * | 10/1998 | Hara | B60K 23/0808 180/233 |
| 5,839,084 A | 11/1998 | Takasaki et al. | |
| 6,549,840 B1 * | 4/2003 | Mikami | B60K 6/365 180/243 |
| 6,834,225 B1 * | 12/2004 | Jiang | B60K 17/35 180/197 |
| 6,907,953 B2 * | 6/2005 | Shigeta | B60K 23/0808 180/245 |
| 8,412,429 B2 * | 4/2013 | Mita | B60K 17/35 477/174 |
| 8,696,510 B2 * | 4/2014 | Arai | B60K 17/348 475/220 |
| 8,777,805 B2 * | 7/2014 | Grutter | B60K 6/48 477/5 |
| 8,930,104 B1 * | 1/2015 | Alexander | B60K 23/08 701/69 |
| 8,958,965 B2 | 2/2015 | Perkins et al. | |
| 9,022,158 B2 * | 5/2015 | Mita | B60K 17/34 180/233 |
| 2001/0042652 A1 * | 11/2001 | Watson | B60K 17/342 180/249 |
| 2002/0033293 A1 * | 3/2002 | Fukuda | B60K 23/0808 180/250 |
| 2002/0125057 A1 * | 9/2002 | Kitai | B60K 23/08 180/233 |
| 2003/0006076 A1 * | 1/2003 | Tamor | B60W 10/06 180/65.25 |
| 2003/0201130 A1 * | 10/2003 | Murakami | B60K 23/0808 180/248 |
| 2003/0226702 A1 * | 12/2003 | Imai | B60K 23/0808 180/247 |
| 2004/0038775 A1 * | 2/2004 | Shimizu | B60K 6/44 477/6 |
| 2004/0211611 A1 * | 10/2004 | Ohno | B60K 17/344 180/244 |
| 2004/0222029 A1 | 11/2004 | Shigeta et al. | |
| 2005/0004732 A1 * | 1/2005 | Berry | B60W 10/06 701/48 |
| 2005/0029035 A1 * | 2/2005 | Shigeta | B60K 23/0808 180/248 |
| 2005/0121247 A1 * | 6/2005 | Murakami | B60K 23/0808 180/244 |
| 2005/0121248 A1 * | 6/2005 | Ushiroda | B60K 23/0808 180/248 |
| 2006/0041346 A1 * | 2/2006 | Sugo | B60K 17/35 701/29.7 |
| 2007/0193793 A1 * | 8/2007 | Burrows | B60K 6/48 180/65.21 |
| 2009/0024262 A1 * | 1/2009 | Amamiya | B60K 6/445 701/22 |
| 2009/0076696 A1 * | 3/2009 | Perkins | B60K 23/08 701/69 |
| 2009/0277711 A1 * | 11/2009 | Hoffmann | B60K 23/0808 180/247 |
| 2009/0291801 A1 * | 11/2009 | Matsubara | B60K 6/365 477/5 |
| 2010/0094519 A1 * | 4/2010 | Quehenberger | B60K 17/35 701/69 |
| 2011/0082004 A1 * | 4/2011 | Kato | B60K 17/344 475/303 |
| 2011/0167944 A1 * | 7/2011 | Yoshinami | B60K 17/34 74/473.1 |
| 2011/0271781 A1 * | 11/2011 | Takaira | B60K 23/08 74/473.1 |
| 2014/0025259 A1 * | 1/2014 | Szwabowski | B60W 50/00 701/36 |
| 2014/0058638 A1 * | 2/2014 | Taniguchi | B60W 10/06 701/69 |
| 2014/0067216 A1 * | 3/2014 | Stares | B60K 17/34 701/69 |
| 2014/0067217 A1 * | 3/2014 | Stares | B60K 23/0808 701/69 |
| 2014/0067218 A1 * | 3/2014 | Stares | B60K 23/08 701/69 |
| 2014/0067219 A1 * | 3/2014 | Stares | B60K 17/34 701/69 |
| 2014/0074368 A1 * | 3/2014 | Stares | B60K 17/34 701/69 |
| 2014/0080673 A1 * | 3/2014 | Stares | B60K 17/34 477/174 |
| 2014/0088833 A1 * | 3/2014 | Matsuno | B60W 30/045 701/41 |
| 2014/0100750 A1 * | 4/2014 | Stares | B60K 17/34 701/69 |
| 2014/0129105 A1 * | 5/2014 | Shigeta | B60K 17/35 701/69 |
| 2014/0136062 A1 * | 5/2014 | Mita | B60K 23/08 701/65 |
| 2014/0172258 A1 * | 6/2014 | Mita | B60K 23/08 701/69 |
| 2014/0372014 A1 * | 12/2014 | Hancock | F02N 11/0833 701/112 |
| 2015/0142280 A1 * | 5/2015 | Tamoto | B60W 10/119 701/53 |
| 2015/0224989 A1 * | 8/2015 | Fairgrieve | B60W 50/082 701/37 |
| 2016/0185216 A1 * | 6/2016 | Clarke | B60K 17/35 74/665 F |

FOREIGN PATENT DOCUMENTS

| | | |
|---|---|---|
| GB | 2407804 A | 5/2005 |
| JP | 2009292307 A | 12/2009 |
| WO | 03039901 A1 | 5/2003 |
| WO | WO2011107222 A1 | 9/2011 |

OTHER PUBLICATIONS

Great Britain Combined Search and Examination Report for corresponding application No. 1202809.8, dated Jun. 21, 2012, 6 pages.

English Summary of Chinese Office Action corresponding to CN application No. 201280019252.8, dated Jan. 22, 2016, 9 pages.

* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable change the number of wheels that provide torque to drive the vehicle.

BACKGROUND

It is known to provide a motor vehicle having a two wheel drive mode of operation in which motive power is supplied to one pair of wheels of the vehicle and a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select the two wheel drive or the four wheel drive mode of operation.

Some driveline systems require the vehicle to be stationary when transitioning between the two and four wheel drive modes. Such systems may be referred to as static disconnect/ reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to assume the four wheel drive mode when a prescribed condition is met and automatically to assume the two wheel drive mode when the prescribed condition is not met.

The present inventors have recognised that a problem exists with vehicles equipped with such systems. That is, rapid switching between the two wheel and four wheel drive conditions (a phenomenon that may be described as 'mode chattering') may occur when the condition for which the four wheel drive mode should be assumed is met shortly after the condition is not met.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a motor vehicle and a method.

In a further aspect of the invention for which protection is sought there is provided a motor vehicle having:
prime mover means;
at least first and second groups of one or more wheels; and
a driveline operable by means of control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by means of an auxiliary portion comprising first and second releasable torque transmitting means and a prop shaft, the first releasable torque transmitting means being operable to connect a first end of the prop shaft to the torque transmission path, the second releasable torque transmitting means being operable to connect a second end of the prop shaft to the second group of one or more wheels,
the control means being operable to control the auxiliary portion to switch the driveline between the first and second modes of operation such that in the first mode the prop shaft is disconnected from both the torque transmission path and said second group of one or more wheels,
the driveline being operable to transition from the first mode to the second mode responsive to a value of at least one vehicle operating parameter, when a transition to the second mode is made the vehicle being operable not to transition back to the first mode from the second mode before a disconnect delay period has expired.

It is to be understood that reference herein to a group of one or more wheels includes reference to a group having a membership of only one wheel.

Embodiments of the invention have the advantage that a risk that the driveline suffers mode chattering is reduced. By mode chattering is meant that the vehicle transitions between the first and second modes repeatedly within a relatively short period of time. For example if a vehicle is arranged to transition from the first mode to the second mode when speed falls below a prescribed value mode chattering can occur if the vehicle speed fluctuates about the prescribed value. The speed may fluctuate about the prescribed value due to traffic conditions, or where a driver is seeking to maintain a speed that is similar to the prescribed value.

In an embodiment the driveline is operable to transition from the first mode to the second mode when the condition is met that the value of one said at least one vehicle operating parameter is less than or greater than a first threshold value,
the vehicle being operable subsequently to transition from the second mode to the first mode when the condition is met that the value of said at least one vehicle operating parameter is greater than or less than the first threshold value and that the disconnect delay period has expired since the transition to the second mode was made.

Embodiments of the invention have the advantage that a risk of mode chattering is reduced since the transition from the second mode is made only if (1) a disconnect delay period has elapsed and (2) the condition that resulted in the second mode being assumed is no longer met.

In an embodiment the driveline is operable to transition from the first mode to the second mode when the magnitude of the value of the at least one vehicle operating parameter is less than or greater than a corresponding first threshold value of said at last one parameter,
when the disconnect delay period has expired the driveline being operable subsequently to transition from the second mode to the first mode when the magnitude of the value of said vehicle operating parameter is greater than or less than a corresponding second threshold value of said at last one parameter, the second threshold value having a value different from the first threshold value.

In an embodiment the transition back to the first mode may be made only when one or more conditions in respect of one or more further operating parameters are met in addition to the requirement in respect of any operating parameter triggering the transition from the first mode to the second mode.

Thus, for example, in some embodiments if any other conditions in respect of a vehicle operating parameter passing through a threshold value and triggering driveline connect have been met, each of these conditions must no longer be met before a transition from the second mode to the first mode may be permitted.

It is to be understood that in some embodiments an operating parameter that triggers a connect event being a transition from the first mode to the second mode may not be an operating parameter than can trigger a disconnect event alone. Thus, in some embodiments a disconnect event may require that a condition in respect of each of one or more further operating parameters must be met before the disconnect event is permitted, in addition to the requirement that any operating parameter that has triggered a connect event no longer has a value that would trigger a connect event (i.e. a transition from the first mode to the second mode).

For example, torque delivery through the driveline may be required to be less than a threshold value before disconnect can occur. The torque may be an instantaneous value of torque at the time disconnect is desired or a torque level throughout a prescribed period of time. If the condition in respect of torque delivery through the driveline is not met then the transition to the first mode may not be made until the condition is met even if the value of any operating parameter triggering the transition to the second mode has subsequently assumed a value allowing a disconnect event to take place.

In an embodiment timing of the disconnect delay period by the control means begins at the moment the second mode is assumed.

Optionally timing of the disconnect delay period by the control means begins again each time a value of a vehicle operating parameter changes from a value that does not correspond to a condition for the second mode to be assumed to a value that does correspond to a condition for the second mode to be assumed.

Optionally when the driveline is in the second mode timing of the disconnect delay period by the control means begins when the condition is met that none of the operating parameters have a value requiring the second mode to be assumed.

In other words if when the vehicle is in the second mode an operating parameter changes from a value that would not trigger a connect event to a value that would trigger a connect event, the disconnect delay period is reset and begins again.

In a further alternative when the vehicle is in the second mode the disconnect delay period begins when the condition is met that none of the operating parameters have a value requiring the second mode to be assumed.

This feature has the advantage that a risk of mode chattering is still further reduced.

In a still further alternative, the disconnect delay period may begin when the value of any parameter that has triggered a connect event has attained a value allowing disconnect to take place.

Optionally when the vehicle is in the second mode timing of the disconnect delay period by the control means begins when the condition is met that the value of said at least one vehicle operating parameter is less than or greater than the first threshold value.

Optionally when the vehicle is in the second mode timing of the disconnect delay period begins when the condition is met that the value of said at least one vehicle operating parameter is greater than or less than the second threshold value.

In an embodiment the length of the disconnect delay period is dependent on a value of at least one vehicle operating parameter.

In an embodiment the length of the disconnect delay period to be timed by the control means is dependent on the identity of the operating parameter that triggered the transition from the first mode to the second mode of operation.

In an embodiment the disconnect delay period is responsive to the difference between the first threshold value and the value of the operating parameter triggering the transition to the second mode at the time the transition to the second mode is made.

This feature has the advantage that the disconnect delay period may be made adaptive to a magnitude of the 'event' that triggered the driveline to assume the second mode of operation.

That is, the disconnect delay period may vary according to a parameter which may be responsive to one or more of a driving style of a user, a condition of the vehicle and an environmental condition. Other arrangements are also useful.

Thus if a user exhibits an aggressive driving style resulting in an increased difference between the prescribed value and actual value of the parameter when the second mode is assumed the disconnect delay period may respond to the driving style by increasing or decreasing the disconnect delay period according to the configuration of the controller.

For certain parameters the disconnect delay period may be increased whilst for others it may be decreased.

In an embodiment the disconnect delay period is responsive to the rate of connection by the driveline of the second group of one or more wheels when the transition to the second mode is made.

In an embodiment the rate of connection is responsive to at least one selected from amongst the value of at least one operating parameter and the identity of the operating parameter triggering the transition to the second mode.

Thus the rate of connection may also be adaptive and the disconnect delay period depend on the rate of connection.

The disconnect delay period may be arranged to increase as a function of increasing rate of connection.

Alternatively the disconnect delay period may be arranged to decrease as a function of increasing rate of connection.

In an embodiment the disconnect delay period is dependent on an output of a drive style evaluator, the drive style evaluator being arranged to provide an output responsive to a driving style of a user over an evaluation time period.

In an embodiment the output of the drive style evaluator is responsive to at least one selected from amongst:

(a) an average rate of acceleration and/or deceleration of the vehicle over the evaluation time period, (b) a peak value of rate of acceleration and/or deceleration over the evaluation time period, (c) an instantaneous value of rate of acceleration and/or deceleration, (d) an average value of rate of change of steering wheel position over the evaluation time period, (e) a peak value of rate of change of steering position over the evaluation time period, (f) an instantaneous value of rate of change of steering wheel position, (g) an average value of rate of change of throttle position over the evaluation time period, (h) a peak value of rate of change of throttle position over the evaluation time period, (i) an instantaneous value of rate of change of throttle position, (j) an average value of torque transmitted to the second group of wheels over the evaluation time period, (k) a peak value of torque transmitted to the second group of wheels over the evaluation time period and (l) an instantaneous value of torque transmitted to the second group of wheels.

In an embodiment the vehicle has a plurality of driver selectable vehicle programs operable to control a performance of the vehicle, the disconnect delay period being responsive to the identity of the driver selected vehicle program controlling performance of the vehicle when a transition from the first mode to the second mode is made.

By vehicle program is included a vehicle program arranged to change one or more of a throttle map, gear shift map, suspension response or any other suitable vehicle system or operating parameter. For example, a terrain response program such as a 'sand program', a 'grass or gravel program' a 'snow or ice program', a 'dynamic mode' program or any other suitable program.

Optionally the disconnect delay period is responsive to at least one environmental condition.

The at least one environmental condition may be one selected from amongst:

(a) an ambient temperature, (b) an ambient moisture level, (c) a determination whether or not precipitation is present, (d) a determination whether a level of moisture on a driving surface exceeds a prescribed value and (e) a determination whether an estimated coefficient of friction of the driving surface exceeds a prescribed value.

In an embodiment the condition in respect of the at least one vehicle operating parameter for the transition to the second mode to take place is one selected from amongst the conditions that:

(a) an instantaneous amount of torque being delivered through the driveline to one or more wheels is above a first prescribed instantaneous torque threshold, (b) a steering wheel angle is above a first prescribed steering wheel angle threshold, (c) a steerable road wheel angle is greater than a first prescribed steerable road wheel angle threshold, (d) a rate of change of steerable road wheel angle exceeds a first prescribed steerable road wheel angle rate threshold, (e) a rate of change of steering wheel angle exceeds a first prescribed steering wheel angle rate threshold, (f) a lateral acceleration of the vehicle is greater than a first prescribed lateral acceleration threshold, (g) a rate of change of lateral acceleration exceeds a first prescribed lateral acceleration rate threshold, (h) a throttle or accelerator pedal position value is greater than a first prescribed throttle or accelerator pedal position threshold, (i) a rate of change of throttle or accelerator pedal position is greater than a first prescribed throttle or accelerator pedal position rate threshold, (j) a driver demanded torque is greater than a first prescribed driver demanded torque threshold, (k) a prime mover torque is greater than a first prescribed prime mover torque threshold, (lk) an amount of wheel slip is above a first prescribed wheel slip threshold, (m) a vehicle acceleration is greater than a first prescribed vehicle acceleration threshold, (n) a vehicle deceleration is greater than a first prescribed vehicle deceleration threshold, (o) a yaw rate of the vehicle is greater than a first prescribed yaw rate threshold, (p) a yaw rate error is greater than a first prescribed yaw rate error threshold, (q) a speed of the vehicle is below a first prescribed vehicle speed threshold, (r) an operating temperature is below a first prescribed operating temperature threshold, (s) an ambient temperature is below a first prescribed ambient temperature threshold, (t) a temperature of a vehicle component is below a first prescribed component temperature threshold, (u) a temperature of a vehicle fluid is below a first prescribed fluid temperature threshold, (v) a temperature of a component of the auxiliary driveline is below a first prescribed driveline component lower temperature threshold, (w) a temperature of a fluid of the auxiliary driveline is below a first prescribed driveline fluid lower temperature threshold, (x) a temperature of a component of the auxiliary driveline is above a first prescribed driveline component upper temperature threshold greater than the first prescribed driveline component lower temperature threshold, (y) a temperature of a fluid of the auxiliary driveline is above a first prescribed driveline fluid upper temperature threshold greater than the first prescribed driveline fluid lower temperature threshold, (z) a roughness of a driving surface is above a first prescribed surface roughness threshold (a1) a brake pedal position value is greater than a first prescribed brake pedal position threshold, and (b1) a brake pressure value is greater than a first prescribed brake pressure threshold.

In an embodiment the corresponding conditions (a) to (b1) for the transition from the second mode to the first mode in respect of the conditions (a) to (b1) triggering the transition from the first mode to the second mode are that:

(a) an instantaneous amount of torque being delivered through the driveline to one or more wheels is less than a second prescribed instantaneous torque threshold less than the first threshold, (b) a steering wheel angle is below a second prescribed steering wheel angle threshold less than the first threshold, (c) a steerable road wheel angle is less than a second prescribed steerable road wheel angle threshold less than the first threshold, (d) a rate of change of steerable road wheel angle is less than a second prescribed steerable road wheel angle rate threshold less than the first threshold, (e) a rate of change of steering wheel angle is less than a second prescribed steering wheel angle rate threshold less than the first threshold, (f) a lateral acceleration of the vehicle is less than a second prescribed lateral acceleration threshold less than the first threshold, (g) a rate of change of lateral acceleration is less than a second prescribed lateral acceleration rate threshold less than the first threshold, (h) a throttle or accelerator pedal position value is less than a second prescribed throttle or accelerator pedal position threshold less than the first threshold, (i) a rate of change of throttle or accelerator pedal position is less than a second prescribed throttle or accelerator pedal position rate threshold less than the first threshold, (j) a driver demanded torque is less than a second prescribed driver demanded torque threshold less than the first threshold, (k) a prime mover torque is less than a second prescribed prime mover torque threshold less than the first threshold, (l) an amount of wheel slip is less than a second prescribed wheel slip threshold less than the first threshold, (m) a vehicle acceleration is less than a second prescribed vehicle acceleration threshold less than the first threshold, (n) a vehicle deceleration is less than a second prescribed vehicle deceleration threshold less than the first threshold, (o) a yaw rate of the vehicle is less than a second prescribed yaw rate threshold less than the first threshold, (p) a yaw rate error is less than a second prescribed yaw rate error threshold less than the first threshold, (q) a speed of the vehicle is above a second prescribed vehicle speed threshold greater than the first threshold, (r) an operating temperature is above a second prescribed operating temperature threshold greater than the first threshold, (s) an ambient temperature is above a second prescribed ambient temperature threshold greater than the first threshold, (t) a temperature of a vehicle component is above a second prescribed component temperature threshold greater than the first threshold, (u) a temperature of a vehicle fluid is above a second prescribed fluid temperature threshold greater than the first threshold, (v) a temperature of a component of the auxiliary driveline is above a second prescribed driveline component lower temperature threshold greater than the first threshold, (w) a temperature of a fluid of the auxiliary driveline is above a second prescribed driveline fluid lower temperature threshold greater than the first threshold, (x) a temperature of a component of the auxiliary driveline is below a second prescribed driveline component upper temperature threshold less than the first threshold, (y) a temperature of a fluid of the auxiliary driveline is below a second prescribed driveline fluid upper temperature threshold less than the first threshold, (z) a roughness of a driving surface is below a second prescribed surface roughness threshold less than the first threshold, (a1) a brake pedal position value is less than a second prescribed brake pedal position threshold less than the first threshold, and (b1) a brake pressure value is less than a second prescribed brake pressure threshold less than the first threshold, Optionally the transition to the second mode may only be made when an amount of torque being delivered through the driveline to one or more wheels is below a prescribed threshold.

In an embodiment the transition to the first mode may only be made when an amount of torque being delivered through the driveline to one or more wheels is below a prescribed threshold.

In an embodiment the requirement that the amount of torque being delivered through the driveline to one or more wheels is below a prescribed threshold includes the requirement that the amount of torque is the amount of instantaneous torque at the time disconnect is required.

In an embodiment the requirement that the amount of torque being delivered through the driveline to one or more wheels is below a prescribed threshold includes the requirement that the amount of torque is below the prescribed threshold for a period equal to the disconnect delay period.

In an embodiment the requirement that the amount of torque being delivered through the driveline to one or more wheels is below a prescribed threshold includes the requirement that the amount of torque is below the prescribed threshold for at least a prescribed period that is less than the disconnect delay period.

By way of example, the vehicle may be arranged such that the disconnect delay period is 5 seconds whilst the amount of torque must be below the prescribed threshold for less than 3 s before a transition to the first mode may occur.

In an embodiment the prime mover means comprises at least one selected from amongst an engine and an electric machine.

In one aspect of the invention there is provided a method of controlling a motor vehicle driveline to transition between first and second modes of operation, in the first mode of operation a prime mover means of the vehicle being arranged to drive a first group of one or more wheels and not a second group of one or more wheels, in the second mode of operation the prime mover means being arranged to drive the first group of one or more wheels and the second group of one or more wheels, the method comprising the step of controlling the driveline to assume the second mode of operation responsive to a value of at least one vehicle operating parameter, the method comprising subsequently transitioning back to the first mode from the second mode when it is required to transition back to the first mode provided a disconnect delay period has expired, the step of transitioning from the first mode to the second mode comprising the step of connecting the second group of one or more wheels to the prime mover means by connecting a first end of a prop shaft to the prime mover means by means of a first releasable torque transmitting means and connecting a second end of the prop shaft to the second group of one or more wheels by means of a second releasable torque transmitting means.

In another aspect of the invention there is provided a motor vehicle having: a prime mover; at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising releasable torque transmitting means operable to connect and disconnect the second group of one or more wheels from the prime mover when the driveline transitions between the first mode and the second mode, the vehicle being operable to transition from the first mode to the second mode responsive to a value of at least one vehicle operating parameter, the vehicle being arranged to remain in the second mode for a period not less than a disconnect delay period thereby to reduce a likelihood of mode chattering.

In an embodiment the vehicle is operable to transition from the first mode to the second mode when the condition is met that the value of one said at least one vehicle operating parameter passes through a first threshold value in a first direction, the vehicle being operable subsequently to transition from the second mode to the first mode when the condition is met that the value of said at least one vehicle operating parameter has passed through the first threshold value in a second direction opposite the first direction and that the disconnect delay period has expired.

It is to be understood that reference herein to a group of one or more wheels includes reference to a group having a membership of only one wheel.

By mode chattering is meant that the vehicle transitions between the first and second modes repeatedly within a relatively short period of time. For example if a vehicle is arranged to transition from the first mode to the second mode when speed falls below a prescribed value mode chattering can occur if the vehicle speed fluctuates about the prescribed value. The speed may fluctuate about the prescribed value due to traffic conditions, or where a driver is seeking to maintain a speed that is similar to the prescribed value.

Embodiments of the invention have the advantage that a risk of mode chattering is reduced since the transition from the second mode is made only if (1) a disconnect delay period has elapsed and (2) the condition that resulted in the second mode being assumed is no longer met.

In an embodiment the vehicle is operable to transition from the first mode to the second mode when the condition is met that the value of said at least one vehicle operating parameter has passed through the first threshold value in a first direction away from a second threshold value, the vehicle being operable subsequently to transition from the second mode to the first mode when the condition is met that the value of said at least one vehicle operating parameter has passed through the second threshold value in a second direction opposite first direction and that the disconnect delay period has expired.

Optionally the transition back to the first mode may be made only when one or more conditions in respect of one or more further operating parameters are met in addition to the requirement in respect of any operating parameter triggering the transition from the first mode to the second mode.

In a further aspect of the invention there is provided a method of controlling a motor vehicle to transition between first and second modes of operation, in the first mode of operation a prime mover of the vehicle being connected to a first group of one or more wheels and in the second mode of operation the prime mover being connected to the first group of one or more wheels and to a second group of one or more wheels, the method comprising controlling the vehicle to transition from the first mode to the second mode responsive to a value of at least one vehicle operating parameter; and controlling the vehicle to remain in the second mode for a period not less than a disconnect delay period thereby to reduce a likelihood of mode chattering.

In one aspect of the invention there is provided a motor vehicle having: a prime mover; at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising releasable torque transmitting means operable to connect and disconnect the second group of one or more wheels from the prime mover when the driveline transitions between the first mode and the second mode, the vehicle being operable to transition from the first mode to the second mode responsive to a value of at least one vehicle operating parameter and subsequently to transition back to the first mode responsive to the value of the same at least one operating parameter upon expiry of a disconnect delay period thereby to reduce a likelihood of mode chattering.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
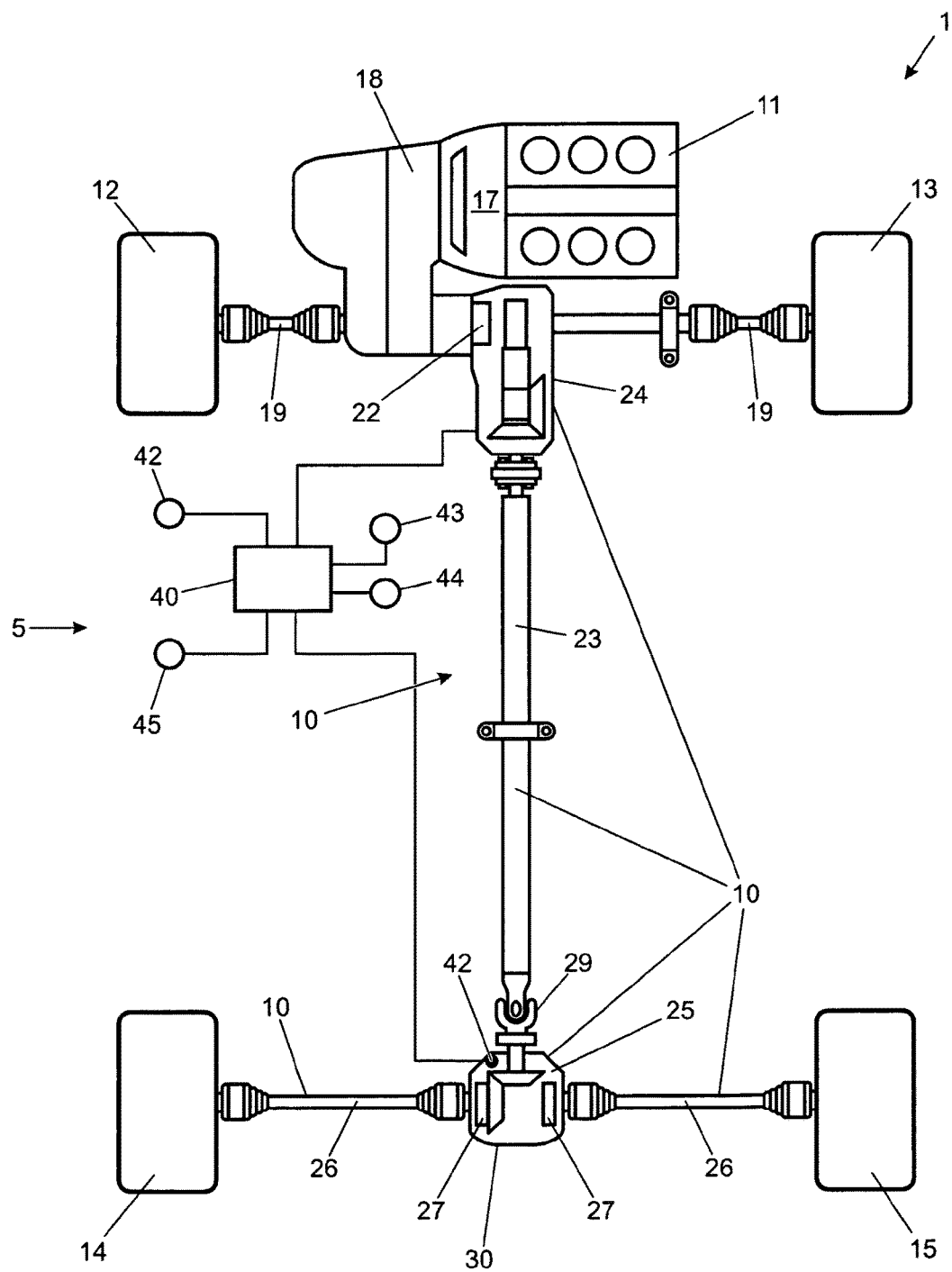
FIG. 1 is a schematic illustration of a vehicle according to an embodiment of the present invention.

A driveline 5 of a motor vehicle according to an embodiment of the present invention is illustrated schematically in FIG. 1. The driveline 5 is connected to a prime mover in the form of an internal combustion engine 11 and has a gear box 18, a pair of front wheels 12, 13, an auxiliary portion 10 and a pair of rear wheels 14, 15.

The driveline 5 is arranged selectively to transmit power supplied to the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted to the front wheels 12, 13 via a pair of front drive shafts 19 of the driveline 5.

Power is transmitted to the rear wheels 14, 15 by means of the auxiliary portion 10. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the differential 27.

The controller 40 also has a temperature sensor 42 arranged to measure an ambient temperature T being a temperature of the environment in which the vehicle is operating.

In some alternative embodiments the controller 40 is arranged to receive data indicative of the ambient temperature T, for example by means of another electronic control unit (ECU) such as an engine management system. In some embodiments the controller 40 is arranged to receive the data by means of a controller area network (CAN) bus.

In the embodiment of FIG. 1 the driveline 5 may be configured to transition from the two wheel drive mode to the four wheel drive mode in which the PTC 22 and the differential clutches 27 are closed according to the state $S_{ds}$ of a driver-operable switch 45. However the driver operable switch may be over-ridden by the controller 40 under certain circumstances. Thus the actual state $S_a$ of the driveline 5 may differ from the driver-selected state $S_{ds}$. State '$S_a=0$' corresponds to the first mode of operation and state '$S_a=1$' corresponds to the second mode of operation.

In some alternative embodiments the driver-operable switch 45 may be replaced by an alternative control input, such as an input from a vehicle controller arranged to run a vehicle program that determines which mode the vehicle should assume at a given moment in time. This vehicle controller may be a separate physical controller, or a software program run by controller 40. The control input may be a software-implemented input or in the form of a physical electrical terminal.

As noted above the vehicle program may be one of a plurality of driver selectable vehicle programs operable to control a performance of the vehicle. A vehicle program may be a program arranged to change one or more of a throttle map, a gear shift map, a suspension response or any other suitable vehicle system or operating parameter. For example, the vehicle program may be a terrain response program such as a 'sand program', a 'grass or gravel program' a 'snow or ice program', a 'dynamic mode' program or any other suitable program.

Figure 2:
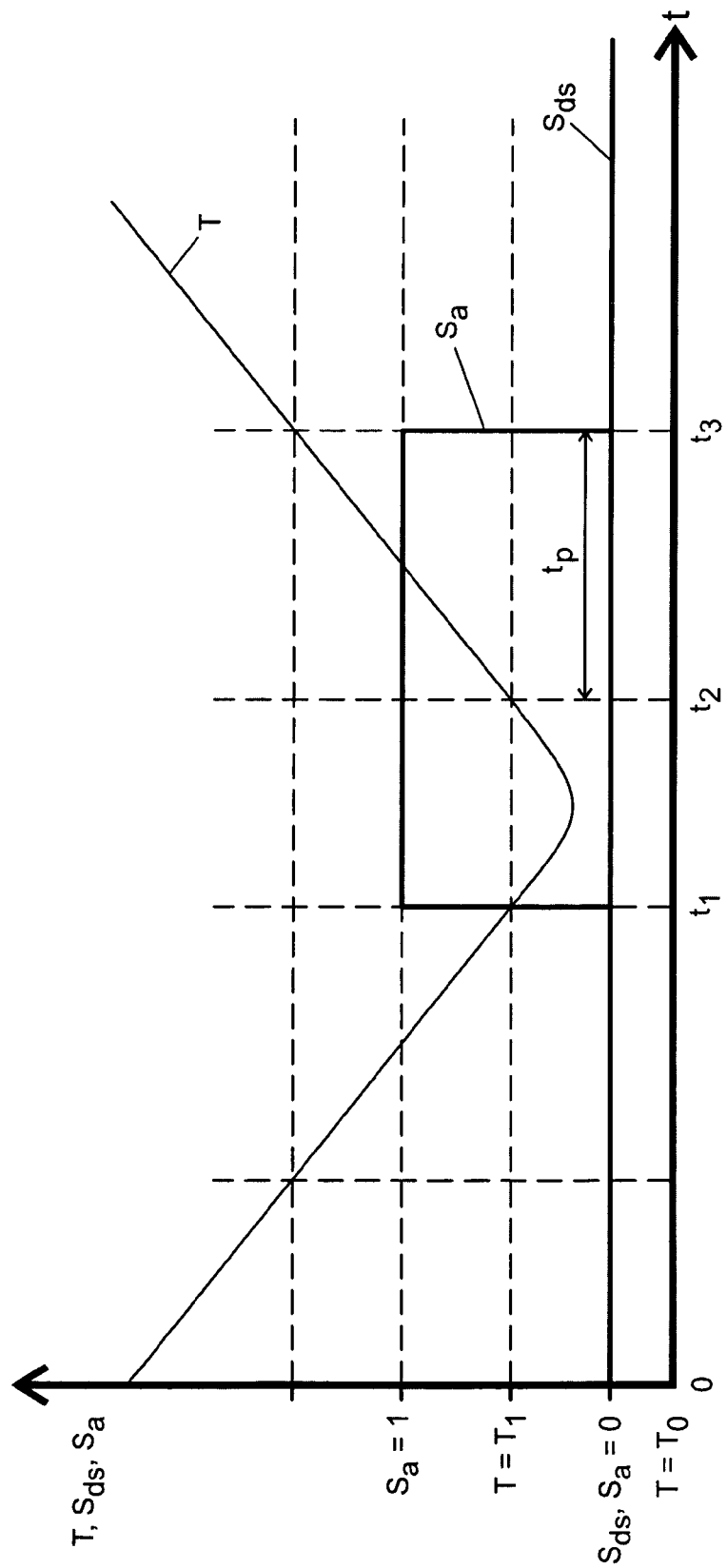
FIG. 2 is a plot of actual and driver-selected driveline states $S_a$, $S_{ds}$ respectively and ambient temperature T as a function of time during an example drive cycle in a vehicle according to an embodiment of the invention.

Operation of a driveline 5 according to the embodiment of FIG. 1 is illustrated by the plots of FIG. 2. The plots show a driver selected state $S_{ds}$ of the driveline 5 and an actual state 5, of the driveline 5 as a function of time as an ambient temperature T to which the driveline 5 was exposed fell from a temperature above $T_1$ to a temperature below $T_1$ and then rose back to a temperature above $T_1$.

As shown in FIG. 2, with operational mode switch 45 set to two wheel drive operation, as the ambient temperature T falls below threshold temperature $T_1$ (at time $t_1$) the controller 40 controls the driveline 5 automatically to transition to the four wheel drive mode of operation ($S_a=1$). That is, when the temperature T falls below $T_1$ the controller 40 generates a signal to close the PTC 22 and the clutches 27.

The driveline 5 is configured to return to the two wheel drive mode ($S_a=0$) from the four wheel drive mode when the temperature T measured by the temperature sensor 42 exceeds the threshold temperature $T_1$ and the measured temperature has been above $T_1$ for a period of time $t_p$ that will be referred to as a 'disconnect delay' period. In some embodiments $T_1$ may be around −20° C. Other temperatures are also useful.

Thus, when the temperature T rises above $T_1$ (at time $t_2$) the controller 40 starts a timer. Once a period of time equal to the disconnect delay period $t_p$ has expired (at time $t_2+t_p=t_3$) the controller 40 controls the driveline 5 to transition back to the two wheel drive mode.

Thus, a disconnection event in which disconnection of the rear wheels 14, 15 from the engine 11 occurs and the two wheel drive mode is resumed may only take place once the condition for which connection of the auxiliary portion 10 occurred (e.g. $T<T_1$) is no longer met and a period of time equal to the disconnect delay period $t_p$ has elapsed since the condition for connection was no longer met.

In some embodiments several vehicle parameters can trigger connection of the auxiliary driveline 10. In some embodiments one or more of the following parameters can trigger driveline connection:

(a) an instantaneous amount of torque being delivered through the driveline to one or more wheels is above a first prescribed instantaneous torque threshold, (b) a steering wheel angle is above a first prescribed steering wheel angle threshold, (c) a steerable road wheel angle is greater than a first prescribed steerable road wheel angle threshold, (d) a rate of change of steerable road wheel angle exceeds a first prescribed steerable road wheel angle rate threshold, (e) a rate of change of steering wheel angle exceeds a first prescribed steering wheel angle rate threshold, (f) a lateral acceleration of the vehicle is greater than a first prescribed lateral acceleration threshold, (g) a rate of change of lateral acceleration exceeds a first prescribed lateral acceleration rate threshold, (h) a throttle or accelerator pedal position value is greater than a first prescribed throttle or accelerator pedal position threshold, (i) a rate of change of throttle or accelerator pedal position is greater than a first prescribed throttle or accelerator pedal position rate threshold, (j) a driver demanded torque is greater than a first prescribed driver demanded torque threshold, (k) a prime mover torque is greater than a first prescribed prime mover torque threshold, (l) an amount of wheel slip is above a first prescribed wheel slip threshold, (m) a vehicle acceleration is greater than a first prescribed vehicle acceleration threshold, (n) a vehicle deceleration is greater than a first prescribed vehicle deceleration threshold, (o) a yaw rate of the vehicle is greater than a first prescribed yaw rate threshold, (p) a yaw rate error is greater than a first prescribed yaw rate error threshold, (q) a speed of the vehicle is below a first prescribed vehicle speed threshold, (r) an operating temperature is below a first prescribed operating temperature threshold, (s) an ambient temperature is below a first prescribed ambient temperature threshold, (t) a temperature of a vehicle component is below a first prescribed component temperature threshold, (u) a temperature of a vehicle fluid is below a first prescribed fluid temperature threshold, (v) a temperature of a component of the auxiliary driveline is below a first prescribed driveline component lower temperature threshold, (w) a temperature of a fluid of the auxiliary driveline is below a first prescribed driveline fluid lower temperature threshold, (x) a temperature of a component of the auxiliary driveline is above a first prescribed driveline component upper temperature threshold greater than the first prescribed driveline component lower temperature threshold, (y) a temperature of a fluid of the auxiliary driveline is above a first prescribed driveline fluid upper temperature threshold greater than the first prescribed driveline fluid lower temperature threshold, (z) a roughness of a driving surface is above a first prescribed surface roughness threshold, (a1) a brake pedal position value is greater than a first prescribed brake pedal position threshold, and (b1) a brake pressure value is greater than a first prescribed brake pressure threshold.

In some embodiments a threshold value of a parameter triggering the driveline to assume the four wheel drive mode of operation may be different from a threshold value triggering the driveline to assume the two wheel drive mode of operation, i.e. a hysteresis gap may exist between the respective values.

Thus, the corresponding conditions (a) to (b1) to those above for the driveline to assume the two wheel drive mode of operation may be:

(a) an instantaneous amount of torque being delivered through the driveline to one or more wheels is less than a second prescribed instantaneous torque threshold less than the first threshold, (b) a steering wheel angle is below a second prescribed steering wheel angle threshold less than the first threshold, (c) a steerable road wheel angle is less than a second prescribed steerable road wheel angle threshold less than the first threshold, (d) a rate of change of steerable road wheel angle is less than a second prescribed steerable road wheel angle rate threshold less than the first threshold, (e) a rate of change of steering wheel angle is less than a second prescribed steering wheel angle rate threshold less than the first threshold, (f) a lateral acceleration of the vehicle is less than a second prescribed lateral acceleration threshold less than the first threshold, (g) a rate of change of lateral acceleration is less than a second prescribed lateral acceleration rate threshold less than the first threshold, (h) a throttle or accelerator pedal position value is less than a second prescribed throttle or accelerator pedal position threshold less than the first threshold, (i) a rate of change of throttle or accelerator pedal position is less than a second prescribed throttle or accelerator pedal position rate threshold less than the first threshold, (j) a driver demanded torque is less than a second prescribed driver demanded torque threshold less than the first threshold, (k) a prime mover torque is less than a second prescribed prime mover torque threshold less than the first threshold, (l) an amount of wheel slip is less than a second prescribed wheel slip threshold less than the first threshold, (m) a vehicle acceleration is less than a second prescribed vehicle acceleration threshold less than the first threshold, (n) a vehicle deceleration is less than a second prescribed vehicle deceleration threshold less than the first threshold, (o) a yaw rate of the vehicle is less than a second prescribed yaw rate threshold less than the first threshold, (p) a yaw rate error is less than a second prescribed yaw rate error threshold less than the first threshold, (q) a speed of the vehicle is above a second prescribed vehicle speed threshold greater than the first threshold, (r) an operating temperature is above a second prescribed operating temperature threshold greater than the first threshold, (s) an ambient temperature is above a second prescribed ambient temperature threshold greater than the first threshold, (t) a temperature of a vehicle component is above a second prescribed component temperature threshold greater than the first threshold, (u) a temperature of a vehicle fluid is above a second prescribed fluid temperature threshold greater than the first threshold, (v) a temperature of a component of the auxiliary driveline is above a second prescribed driveline component lower temperature threshold greater than the first threshold, (w) a temperature of a fluid of the auxiliary driveline is above a second prescribed driveline fluid lower temperature threshold greater than the first threshold, (x) a temperature of a component of the auxiliary driveline is below a second prescribed driveline component upper temperature threshold less than the first threshold, (y) a temperature of a fluid of the auxiliary driveline is below a second prescribed driveline fluid upper temperature threshold less than the first threshold, (z) a roughness of a driving surface is below a second prescribed surface roughness threshold less than the first threshold, (a1) a brake pedal position value is less than a second prescribed brake pedal position threshold less than the first threshold, and (b1) a brake pressure value is less than a second prescribed brake pressure threshold less than the first threshold.

Thus, in one embodiment the controller 40 is configured to control the driveline 5 to assume the four wheel drive mode of operation when the temperature falls below a first threshold value $T_1$ and to control the vehicle to assume the two wheel drive mode of operation when the temperature rises above a second threshold value $T_2$ greater than the first threshold value $T_1$.

Figure 3:
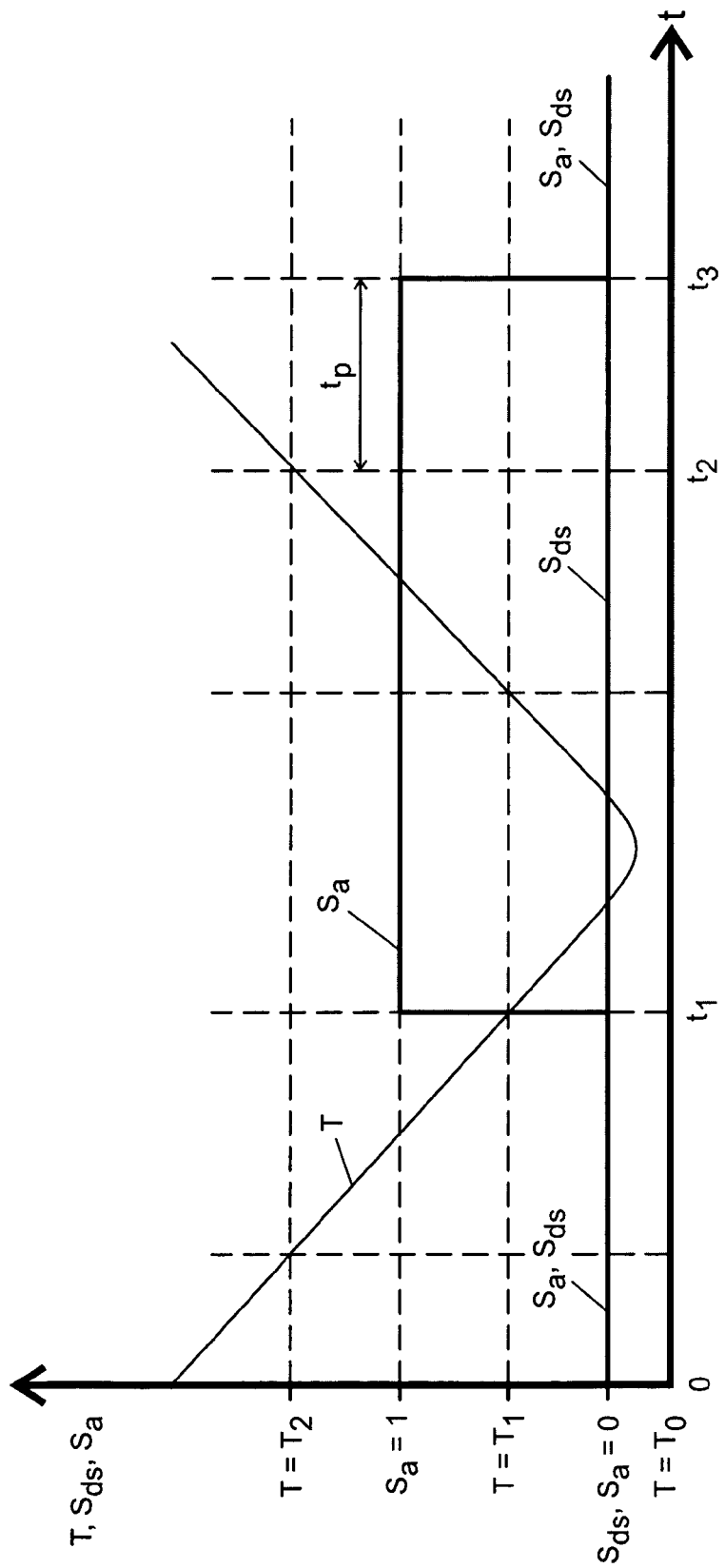
FIG. 3 is a plot of actual and driver-selected driveline states $S_a$, $S_{ds}$ respectively and ambient temperature T as a function of time during an example drive cycle in a vehicle according to a further embodiment of the invention.

FIG. 3 is a plot of temperature T, $S_{ds}$ and $S_a$ as a function of time t for a driveline 5 according to this embodiment.

As in the case of the plot of FIG. 2, the driver-selected state $S_{ds}$ of the driveline 5 was set to zero ($S_{ds}=0$) corresponding to two wheel drive operation throughout the period illustrated in FIG. 3. Thus, at time t=0 when temperature T was greater than $T_2$ the actual state $S_a$ of the driveline 5 was set to the driver selected state $S_{ds}=0$.

From time $t=t_1$ the driveline 5 experienced an ambient temperature $T<T_1$. The actual state $S_a$ of the driveline was therefore set to 1 corresponding to the four wheel drive mode of operation. Thus the controller 40 controlled the PTC 22 and differential clutches 27 to transition the driveline 5 from two wheel drive to four wheel drive operation.

From time $t=t_2$ the driveline 5 experienced a temperature $T>T_2$. Thus at time $t_2$ the controller began timing the period for which $T>T_2$. Once this period exceeded the disconnect delay period $t_p$ (at time $t_3$) the actual state of the driveline $S_a$ was set to the driver selected state $S_{ds}$, i.e. to zero in the embodiment shown.

Thus, at time t=t₃ the controller opened the PTC 22 and differential clutches 27 to transition the driveline 5 from the four wheel drive to two wheel drive mode.

It is to be understood that other arrangements in respect of operation of the driveline 5 are also useful For example, other conditions may be specified for which a transition between two and four wheel drive operation is to be made in addition to or instead of that described above in respect of ambient temperature.

For example, in some embodiments the controller 40 is arranged to receive data corresponding to a temperature of lubricant (such as an oil) in the PTU 24 and/or rear differential 30 rather than ambient temperature. Thus, in the event that a vehicle is travelling in the two wheel drive mode on a dry motorway in low ambient temperatures, where permanent four wheel drive is not required because the vehicle is on dry road, the controller 40 is operable to control the auxiliary driveline 10 to maintain the lubricant temperature above a prescribed value by temporarily engaging four wheel drive.

Thus if the lubricant temperature falls below the first threshold value the controller engages four wheel drive until the lubricant temperature rises above the second threshold value, when the two wheel drive mode is again assumed.

If the temperature of the lubricant subsequently falls below the first threshold value again, the controller 40 re-engages four wheel drive as described above. Thus the operator of the vehicle is able to enjoy improved fuel economy due to the fact that four wheel drive is not permanently engaged. At the same time the operator enjoys the benefit that should it become necessary to assume the four wheel drive mode the lubricant associated with the auxiliary portion 10 is at a temperature that will not cause excessive wear of the components if four wheel drive is suddenly engaged. Furthermore the time taken to effect engagement will not be unacceptably long due to the low temperature (and increased viscosity) of the lubricant.

In some embodiments the controller 40 is arranged to control the driveline 5 to transition between two wheel drive and four wheel drive operation according to a speed of the vehicle. Other operating parameters are also useful in addition to or instead of temperature and speed as noted above.

In some embodiments the controller 40 is configured to inhibit a transition from four wheel drive to two wheel drive mode if an amount of torque being provided by the engine exceeds a prescribed torque value. However once the torque value falls below a threshold level the transition to the two wheel drive mode is permitted to take place.

It is to be understood that the specific arrangements of gears and clutches of the driveline 5 may differ in some embodiments of the invention.

Figure 4:
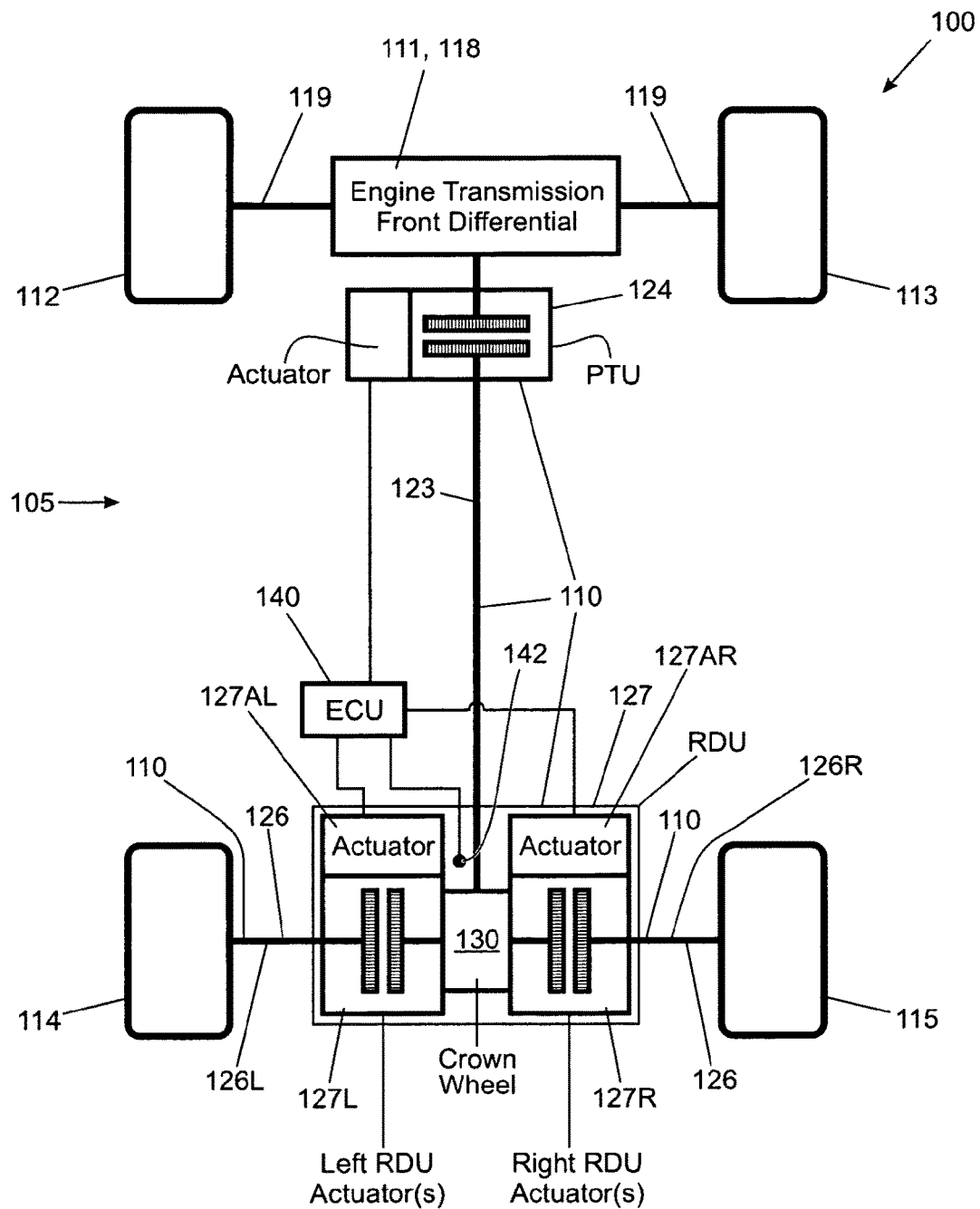
FIG. 4 is a schematic illustration of a vehicle according to a further embodiment of the invention having a rear drive unit (RDU).

FIG. 4 shows a driveline 105 of a vehicle 100 according to a further embodiment of the invention. Like features of the embodiment of FIG. 4 to those of the embodiment of FIG. 1 are provided with like reference signs prefixed numeral 1.

The embodiment of FIG. 4 is similar to that of FIG. 1 in that driveline 105 has a power transfer unit (PTU) 124 (sometimes referred to as a power take off unit) operable to connect one end of a prop shaft 123 of an auxiliary portion 110 to the engine 111 via the transmission 118.

However, instead of a rear differential 30, the auxiliary portion 110 has a rear drive unit (RDU) 127. In the embodiment of FIG. 4 the RDU 127 has a crown wheel 130 coupled to an end of the drive shaft 123 opposite the end of the drive shaft 123 that is connected to the PTU 124.

The RDU 127 also has a pair of friction clutches 127L, 127R operable to couple the crown wheel 130 to left and right rear drive shafts 126L, 126R, respectively.

The RDU 127 is provided with left and right actuators 127AL, 127AR respectively operable to open and close the left and right friction clutches 127L, 127R. The actuators 127AL, 127AR are arranged such that as the actuators 127AL, 127AR move from a first position in which both friction clutches 127L, 127R are open towards a second position in which both friction clutches 127L, 127R are closed, pressure is applied to the respective friction clutches 127L, 127R thereby to close the friction clutches 127L, 127R.

It is to be understood that embodiments of the invention have the advantage that a hysteresis may be introduced in respect of the operational state of the driveline 10, 110 by virtue of the introduction of a disconnect delay period. The introduction of hysteresis in the operational state is arranged to reduce a risk of multiple switching operations between the two wheel and four wheel drive modes of operation (a phenomenon known as 'mode chattering').

The controller 40, 140 may also receive other signals corresponding to vehicle operating parameters. For example signals may be received from a vehicle controller such as a vehicle electronic control unit (ECU), e.g. an antilock braking system (ABS) controller and/or directly from sensors 43, 44 of the vehicle 1 (FIG. 1).

Such signals may include but are not restricted to engine temperature, a driveline temperature such as a driveline fluid temperature (e.g. lubricant or coolant temperature), engine speed, engine torque output, wheel speeds, gear selection, throttle angle, measurements of a longitudinal and/or lateral acceleration by means of a vehicle accelerometer, yaw rate, etc. Signals derived from measurements made by sensors but which have been calculated by a controller may also be used, such as yaw rate error which may be derived by comparing an actual value of yaw rate as measured by a yaw rate sensor with an expected yaw rate, the latter being derived from one or more other signals such as steering angle and vehicle speed.

The controller 40 may for example be arranged to utilise the signals to detect one or more of a) frost conditions using ambient temperature, b) driving styles using rate of steering e.g. steering or road wheel angle and rate of throttle such as throttle position, or rate of change of steering or road wheel angle or throttle position, c) low friction surfaces through steering angle, vehicle speed, throttle maps, lateral acceleration forces, d) gradient as detected using throttle maps, speed and velocity change, e) towing (detected as per 'd)' above), and f) wheel spin detected for example by comparing vehicle speed with individual wheel speeds.

Other arrangements are also useful.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102824.8 filed 18 Feb. 2011, the entire contents of which are expressly incorporated by reference herein.

The invention claimed is:

1. A motor vehicle having:
prime mover means;
at least first and second groups of one or more wheels;
control means; and
a driveline arranged to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being arranged to connect the second group to the torque transmission path by means of an auxiliary portion comprising first and second releasable torque transmitting means and a prop shaft, the first releasable torque transmitting means being arranged to connect a first end of the prop shaft to the torque transmission path, the second releasable torque transmitting means being arranged to connect a second end of the prop shaft to the second group of one or more wheels,
the control means being arranged to control the auxiliary portion to switch the driveline between the first and second modes of operation such that in the first mode the prop shaft is disconnected from both the torque transmission path and said second group of one or more wheels,
wherein, when the driveline is in the second mode, the control means is arranged to operate the vehicle not to transition to the first mode from the second mode unless an at least one vehicle operating parameter has no value corresponding to a condition for the second mode to be assumed during a period of time not less than a disconnect delay period,
wherein the timing of the period of time is commenced only when the driveline is in the second mode.

2. The motor vehicle of claim 1 wherein the driveline is arranged to transition from the first mode to the second mode when the condition is met that the value of one said at least one vehicle operating parameter is less than or greater than a first threshold value,
the vehicle being arranged subsequently to transition from the second mode to the first mode when the condition is met that the value of said at least one vehicle operating parameter is greater than or less than the first threshold value and has been for a period of time not less than the disconnect delay period.

3. The motor vehicle of claim 1 wherein the driveline is arranged to transition from the first mode to the second mode when the magnitude of the value of the at least one vehicle operating parameter is less than or greater than a corresponding first threshold value of said at last one parameter,
the driveline being arranged subsequently to transition from the second mode to the first mode when the magnitude of the value of said vehicle operating parameter is greater than or less than a corresponding second threshold value of said at last one parameter and has been for a period of time not less than the disconnect delay period, the second threshold value having a value different from the first threshold value.

4. The motor vehicle of claim 1 wherein the transition back to the first mode may be made only when one or more conditions in respect of one or more further operating parameters are met in addition to the requirement in respect of any operating parameter triggering the transition from the first mode to the second mode.

5. The motor vehicle of claim 1 wherein timing of the disconnect delay period by the control means begins at the moment the second mode is assumed.

6. The motor vehicle of claim 1 wherein timing of the disconnect delay period by the control means begins again each time a value of a vehicle operating parameter changes from a value that does not correspond to a condition for the second mode to be assumed to a value that does correspond to a condition for the second mode to be assumed.

7. The motor vehicle of claim 1 wherein when the driveline is in the second mode, timing of the disconnect delay period by the control means begins when the condition is met that none of the operating parameters have a value requiring the second mode to be assumed.

8. The motor vehicle of claim 2 wherein when the vehicle is in the second mode, timing of the disconnect delay period by the control means begins when the condition is met that the value of said at least one vehicle operating parameter is less than or greater than the first threshold value.

9. The motor vehicle of claim 8 wherein when the vehicle is in the second mode timing of the disconnect delay period begins when the condition is met that the value of said at least one vehicle operating parameter is greater than or less than the second threshold value.

10. The motor vehicle of claim 1 wherein the length of the disconnect delay period is dependent on a value of at least one vehicle operating parameter.

11. The motor vehicle of claim 1 wherein the length of the disconnect delay period to be timed by the control means is dependent on the identity of the operating parameter that triggered the transition from the first mode to the second mode of operation.

12. The motor vehicle of claim 2 wherein the disconnect delay period is responsive to the difference between the first threshold value and the value of the operating parameter triggering the transition to the second mode at the time the transition to the second mode is made.

13. The motor vehicle of claim 1 wherein the disconnect delay period is responsive to the rate of connection by the driveline of the second group of one or more wheels when the transition to the second mode is made.

14. The motor vehicle of claim 13 wherein the rate of connection is responsive to at least one selected from amongst the value of at least one operating parameter and the identity of the operating parameter triggering the transition to the second mode.

15. The motor vehicle of claim 13 wherein the disconnect delay period is arranged to increase as a function of increasing rate of connection.

16. The motor vehicle of claim 14 wherein the disconnect delay period is arranged to decrease as a function of increasing rate of connection.

17. The motor vehicle of claim 1 wherein the disconnect delay period is dependent on an output of a drive style evaluator, the drive style evaluator being arranged to provide an output responsive to a driving style of a user over an evaluation time period.

18. The motor vehicle of claim 17 wherein the output of the drive style evaluator is responsive to at least one selected from amongst:
   (a) an average rate of acceleration and/or deceleration of the vehicle over the evaluation time period,
   (b) a peak value of rate of acceleration and/or deceleration over the evaluation time period,
   (c) an instantaneous value of rate of acceleration and/or deceleration,
   (d) an average value of rate of change of steering wheel position over the evaluation time period,
   (e) a peak value of rate of change of steering position over the evaluation time period,
   (f) an instantaneous value of rate of change of steering wheel position,
   (g) an average value of rate of change of throttle position over the evaluation time period,
   (h) a peak value of rate of change of throttle position over the evaluation time period,
   (i) an instantaneous value of rate of change of throttle position,
   (j) an average value of torque transmitted to the second group of wheels over the evaluation time period,
   (k) a peak value of torque transmitted to the second group of wheels over the evaluation time period and
   (l) an instantaneous value of torque transmitted to the second group of wheels.

19. The motor vehicle of claim 1 wherein the vehicle has a plurality of driver selectable vehicle programs arranged to control a performance of the vehicle, the disconnect delay period being responsive to the identity of the driver selected vehicle program controlling performance of the vehicle when a transition from the first mode to the second mode is made.

20. The motor vehicle of claim 1 wherein the disconnect delay period is responsive to at least one environmental condition.

21. The motor vehicle of claim 20 wherein the at least one environmental condition is one selected from amongst:
   (a) an ambient temperature,
   (b) an ambient moisture level,
   (c) a determination whether or not precipitation is present,
   (d) a determination whether a level of moisture on a driving surface exceeds a prescribed value and
   (e) a determination whether an estimated coefficient of friction of the driving surface exceeds a prescribed value.

22. The motor vehicle of claim 3 wherein the condition in respect of the at least one vehicle operating parameter for the transition to the second mode to take place is one selected from amongst the conditions that:
   (a) an instantaneous amount of torque being delivered through the driveline to one or more wheels is above a first prescribed instantaneous torque threshold,
   (b) a steering wheel angle is above a first prescribed steering wheel angle threshold,
   (c) a steerable road wheel angle is greater than a first prescribed steerable road wheel angle threshold,
   (d) a rate of change of steerable road wheel angle exceeds a first prescribed steerable road wheel angle rate threshold,
   (e) a rate of change of steering wheel angle exceeds a first prescribed steering wheel angle rate threshold,
   (f) a lateral acceleration of the vehicle is greater than a first prescribed lateral acceleration threshold,
   (g) a rate of change of lateral acceleration exceeds a first prescribed lateral acceleration rate threshold,
   (h) a throttle or accelerator pedal position value is greater than a first prescribed throttle or accelerator pedal position threshold,
   (i) a rate of change of throttle or accelerator pedal position is greater than a first prescribed throttle or accelerator pedal position rate threshold,
   (j) a driver demanded torque is greater than a first prescribed driver demanded torque threshold,
   (k) a prime mover torque is greater than a first prescribed prime mover torque threshold,
   (l) an amount of wheel slip is above a first prescribed wheel slip threshold,
   (m) a vehicle acceleration is greater than a first prescribed vehicle acceleration threshold,
   (n) a vehicle deceleration is greater than a first prescribed vehicle deceleration threshold,
   (o) a yaw rate of the vehicle is greater than a first prescribed yaw rate threshold,
   (p) a yaw rate error is greater than a first prescribed yaw rate error threshold,
   (q) a speed of the vehicle is below a first prescribed vehicle speed threshold,
   (r) an operating temperature is below a first prescribed operating temperature threshold,
   (s) an ambient temperature is below a first prescribed ambient temperature threshold,
   (t) a temperature of a vehicle component is below a first prescribed component temperature threshold,
   (u) a temperature of a vehicle fluid is below a first prescribed fluid temperature threshold,
   (v) a temperature of a component of the auxiliary driveline is below a first prescribed driveline component lower temperature threshold,
   (w) a temperature of a fluid of the auxiliary driveline is below a first prescribed driveline fluid lower temperature threshold,
   (x) a temperature of a component of the auxiliary driveline is above a first prescribed driveline component upper temperature threshold greater than the first prescribed driveline component lower temperature threshold,
   (y) a temperature of a fluid of the auxiliary driveline is above a first prescribed driveline fluid upper temperature threshold greater than the first prescribed driveline fluid lower temperature threshold,
   (z) a roughness of a driving surface is above a first prescribed surface roughness threshold,
   (a1) a brake pedal position value is greater than a first prescribed brake pedal position threshold, and
   (b1) a brake pressure value is greater than a first prescribed brake pressure threshold.

23. The motor vehicle of claim 22 wherein the corresponding conditions (a') to (b1') for the transition from the second mode to the first mode in respect of the conditions (a) to (b1) triggering the transition from the first mode to the second mode are that:
   (a') an instantaneous amount of torque being delivered through the driveline to one or more wheels is less than a second prescribed instantaneous torque threshold less than the first threshold,
   (b') a steering wheel angle is below a second prescribed steering wheel angle threshold less than the first threshold,
   (c') a steerable road wheel angle is less than a second prescribed steerable road wheel angle threshold less than the first threshold,

21

(d') a rate of change of steerable road wheel angle is less than a second prescribed steerable road wheel angle rate threshold less than the first threshold, (e') a rate of change of steering wheel angle is less than a second prescribed steering wheel angle rate threshold less than the first threshold, (f') a lateral acceleration of the vehicle is less than a second prescribed lateral acceleration threshold less than the first threshold, (g') a rate of change of lateral acceleration is less than a second prescribed lateral acceleration rate threshold less than the first threshold, (h') a throttle or accelerator pedal position value is less than a second prescribed throttle or accelerator pedal position threshold less than the first threshold, (i') a rate of change of throttle or accelerator pedal position is less than a second prescribed throttle or accelerator pedal position rate threshold less than the first threshold, (j') a driver demanded torque is less than a second prescribed driver demanded torque threshold less than the first threshold, (k') a prime mover torque is less than a second prescribed prime mover torque threshold less than the first threshold, (l') an amount of wheel slip is less than a second prescribed wheel slip threshold less than the first threshold, (m') a vehicle acceleration is less than a second prescribed vehicle acceleration threshold less than the first threshold, (n') a vehicle deceleration is less than a second prescribed vehicle deceleration threshold less than the first threshold, (o') a yaw rate of the vehicle is less than a second prescribed yaw rate threshold less than the first threshold, (p') a yaw rate error is less than a second prescribed yaw rate error threshold less than the first threshold, (q') a speed of the vehicle is above a second prescribed vehicle speed threshold greater than the first threshold, (r') an operating temperature is above a second prescribed operating temperature threshold greater than the first threshold, (s') an ambient temperature is above a second prescribed ambient temperature threshold greater than the first threshold, (t') a temperature of a vehicle component is above a second prescribed component temperature threshold greater than the first threshold, (u') a temperature of a vehicle fluid is above a second prescribed fluid temperature threshold greater than the first threshold, (v') a temperature of a component of the auxiliary driveline is above a second prescribed driveline component lower temperature threshold greater than the first threshold, (w') a temperature of a fluid of the auxiliary driveline is above a second prescribed driveline fluid lower temperature threshold greater than the first threshold, (x') a temperature of a component of the auxiliary driveline is below a second prescribed driveline component upper temperature threshold less than the first threshold, (y') a temperature of a fluid of the auxiliary driveline is below a second prescribed driveline fluid upper temperature threshold less than the first threshold,

22

(z') a roughness of a driving surface is below a second prescribed surface roughness threshold less than the first threshold, (a1') a brake pedal position value is less than a second prescribed brake pedal position threshold less than the first threshold, and (b1') a brake pressure value is less than a second prescribed brake pressure threshold less than the first threshold.

24. The motor vehicle of claim 1 wherein the transition to the first mode may only be made when an amount of torque being delivered through the driveline to one or more wheels is below a prescribed threshold.

25. The motor vehicle of claim 24 wherein the requirement that the amount of torque being delivered through the driveline to one or more wheels is below a prescribed threshold includes the requirement that the amount of torque is the amount of instantaneous torque at the time disconnect is required.

26. The motor vehicle of claim 24 wherein the requirement that the amount of torque being delivered through the driveline to one or more wheels is below a prescribed threshold includes the requirement that the amount of torque is below the prescribed threshold for a period equal to the disconnect delay period.

27. The motor vehicle of claim 24 wherein the requirement that the amount of torque being delivered through the driveline to one or more wheels is below a prescribed threshold includes the requirement that the amount of torque is below the prescribed threshold for at least a prescribed period that is less than the disconnect delay period.

28. The motor vehicle of claim 1 wherein the prime mover means comprises at least one selected from amongst an engine and an electric machine.

29. A method of controlling a motor vehicle driveline to transition between first and second modes of operation, in the first mode of operation a prime mover means of the vehicle being arranged to drive a first group of one or more wheels and not a second group of one or more wheels, in the second mode of operation the prime mover means being arranged to drive the first group of one or more wheels and the second group of one or more wheels, preventing a transition to the first mode from the second mode unless an at least one vehicle operating parameter has no value corresponding to a condition for the second mode to be assumed during a period of time not less than a disconnect delay period, wherein the timing of the period of time is commenced only when the driveline is in the second mode, the step of transitioning from the first mode to the second mode comprising the step of connecting the second group of one or more wheels to the prime mover means by connecting a first end of a prop shaft to the prime mover means by means of a first releasable torque transmitting means and connecting a second end of the prop shaft to the second group of one or more wheels by means of a second releasable torque transmitting means.

30. A system for a vehicle having a driveline comprising a prime mover, at least a pair of rear wheels, a shaft for connecting the prime mover to the rear wheels and first and second coupling means for selectively connecting the prop shaft to the prime mover and to the rear wheels, respectively, the system comprising control means configured to control operation of the first and second coupling means in one of a first mode of operation, in which the prop shaft is disconnected from both the prime mover and the rear wheels, and a second mode of operation, in which the prime mover is connected to the rear wheels by the prop shaft, the control means being arranged to prevent transition from the second mode of operation to the first mode of operation unless an at least one vehicle operating parameter has no value corresponding to a condition for the second mode to be assumed during a period of time not less than a disconnect delay period, wherein the timing of the period of time is commenced only when the driveline is in the second mode.

* * * * *